UNITED STATES PATENT OFFICE.

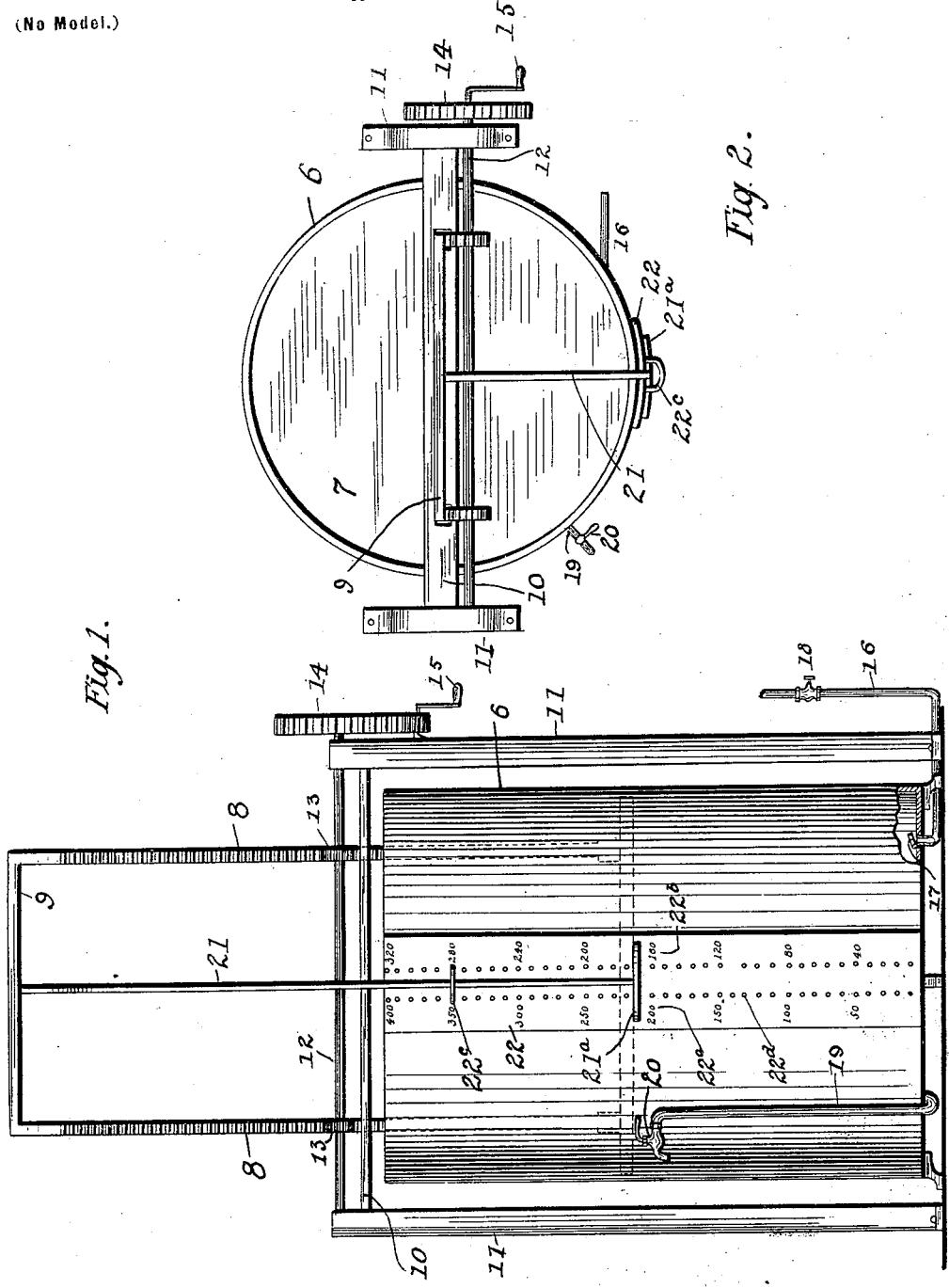

FRANK L. WIEBURG, OF LINDSTROM, MINNESOTA.

MEASURING TANK AND PUMP.

SPECIFICATION forming part of Letters Patent No. 691,515, dated January 21, 1902.

Application filed October 7, 1901. Serial No. 77,854. (No model.)

*To all whom it may concern:*

Be it known that I, FRANK L. WIEBURG, a citizen of the United States, residing at Lindstrom, in the county of Chisago and State of Minnesota, have invented certain new and useful Improvements in Measuring Tanks and Pumps; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a measuring tank and pump particularly for use in creameries, and is designed to afford a convenient means of measuring and returning skim-milk to the patrons of the creamery who may deliver milk to the creamery to have the cream extracted.

A further object of my invention is to provide means for readily indicating the amount of skim-milk to be returned in proportion to the amount of fresh milk delivered.

To accomplish these and other objects, an embodiment of the invention as hereinafter described, and illustrated in the drawings, may be used; but it is to be understood that changes may be made without departing from the nature and scope of my invention.

In the drawings, Figure 1 is a side elevation of the apparatus. Fig. 2 is a top plan view thereof.

To carry out the object of the invention, I use a cylindrical tank (indicated at 6) of known capacity in pounds of skim-milk. In this cylinder a piston 7 reciprocates and is adapted to draw milk into and expel it from the cylinder. The piston is actuated by two rack-bars 8, which are firmly secured at their lower ends to the piston and extend thence upwardly above the top of the cylinder, which is open. The rack-bars are united and properly spaced at the top by a tie-rod 9 and are guided and supported against lateral movement by a beam 10, through mortises in which the rack-bars slidably extend. The beam is secured at each end to standards 11 beside the cylinder. A shaft 12 is journaled in bearings at the top of the standards and carries pinions 13, which mesh with the rack-bars. The shaft is revolved by the gear-wheels 14, actuated by the crank 15. A supply-pipe 16, leading from the main tank of the creamery, enters the bottom of the tank and is provided with a valve 17 and also conveniently with a cock 18. A delivery-pipe 19 communicates with the bottom of the tank and is provided with a stop-cock 20. This pipe conveniently extends and discharges at a height sufficient to allow a milk-can or other vessel to be placed thereunder.

To the tie-rod 9 is secured a rod 21, which is curved to bring it without the plane of the cylinder and extends thence down beside the cylinder before the scale 22. This scale has two sets of graduations $22^a$ and $22^b$, the former indicating the amount of fresh milk delivered and the latter indicating the proportional amount of skim-milk to be returned. The rod 21 passes between the arms of a staple $22^c$, and the staple may be placed in a series of holes $22^d$, corresponding to the units of the scales. When so placed, it acts as a stop to limit the upward movement of the piston.

In operation if a dairyman deliver, say, three hundred and fifty pounds of milk and it be desired to return to him a proportional amount of skim-milk the staple is placed in the holes corresponding to the graduation "350" on the scale $22^a$, which indicates on the scale $22^b$ the proportional amount (two hundred and eighty pounds) of skim-milk he is entitled to have returned. The piston is then lifted by the means above described, and skim-milk is drawn through the pipe 16 until the cross-bar $21^a$ at the lower end of the rod 21 strikes the staple. This arrests further motion and indicates that the desired quantity has been drawn into the cylinder. Then the cock 20 is opened and the piston forced down by reverse movement of the crank, discharging the skim-milk through the pipe 22 into the cans provided to receive it. It will be understood that the scale $22^b$ is in accordance with the capacity of the tank in pounds of skim-milk.

Having thus described the invention, what is claimed as new, and desired to be secured by Letters Patent, is—

In a combined measuring tank and pump, in combination, a tank forming a pump-cylinder, a piston therein, inlet and discharge pipes communicating therewith, a primary scale, a secondary scale related thereto and to the capacity of the pump, a stop for the piston adjustable according to the primary scale, and which indicates such adjustment on the secondary scale.

In testimony whereof I affix my signature in presence of two witnesses.

FRANK L. WIEBURG.

Witnesses:
P. M. QVIST,
P. C. BJORNEBY.